US005297381A

United States Patent [19]

Eich et al.

[11] Patent Number: 5,297,381

[45] Date of Patent: Mar. 29, 1994

[54] HYDRAULIC SYSTEM

[75] Inventors: Otwin Eich; Franz-Peter Salz, both of Remscheid, Fed. Rep. of Germany

[73] Assignee: Barmag AG, Remscheid, Fed. Rep. of Germany

[21] Appl. No.: 920,376

[22] PCT Filed: Dec. 13, 1991

[86] PCT No.: PCT/DE91/00967

§ 371 Date: Oct. 15, 1992

§ 102(e) Date: Oct. 15, 1992

[87] PCT Pub. No.: WO92/10684

PCT Pub. Date: Jun. 25, 1992

[30] Foreign Application Priority Data

Dec. 15, 1990 [DE] Fed. Rep. of Germany ....... 4040176

Jul. 26, 1991 [DE] Fed. Rep. of Germany ....... 4124793

[51] Int. Cl.[5] .............................................. F16D 31/02

[52] U.S. Cl. ........................................ 60/452; 91/518

[58] Field of Search ................. 60/420, 422, 426, 445, 60/451, 452, 549, 468; 91/511, 512, 514, 517, 518

[56] References Cited

U.S. PATENT DOCUMENTS 3,987,622 10/1976 Johnson .
4,103,489 8/1978 Fletcher et al. .................. 60/451 X
4,165,613 8/1979 Bernhoft et al. .
4,507,057 3/1985 Igarashi et al. .
4,537,364 8/1985 Pollman et al. .................. 60/452 X
4,554,992 11/1985 Kassai .............................. 60/451 X
4,617,854 10/1986 Kropp .
4,712,376 12/1987 Hadank et al. .
4,723,478 2/1988 Diel et al. ......................... 91/517 X
4,738,102 4/1988 Kropp .
4,759,183 7/1988 Kreth et al. ........................... 60/422
4,845,950 7/1989 Metzner ............................ 60/451 X
4,856,278 8/1989 Widmann et al. .
4,870,819 10/1989 Walzer .
4,967,557 11/1990 Izumi et al. ........................... 60/423
5,048,293 9/1991 Aoyagi .................................. 60/420
5,056,312 10/1991 Hirata et al. .......................... 60/426
5,167,121 12/1992 Sephhri et al. ................... 60/459 X

FOREIGN PATENT DOCUMENTS 0191275 8/1986 European Pat. Off. .
0366815 5/1990 European Pat. Off. .
0440802 8/1991 European Pat. Off. .
2651325 9/1977 Fed. Rep. of Germany .
3546336 2/1987 Fed. Rep. of Germany .
2650635 2/1991 France .
WO90/02882 9/1989 PCT Int'l Appl. .

*Primary Examiner*—Edward K. Look
*Assistant Examiner*—Hoang Nguyen
*Attorney, Agent, or Firm*—Bell, Seltzer, Park & Gibson

[57] ABSTRACT

In a hydraulic system several consumers (5'; 5''; 5''') are supplied by a common regulating pump (1). The regulating pump (1) is controlled as a function between the pump pressure (delta P) and the highest load pressure. This pressure difference (delta $P_{max}$) is related to a minimum pressure difference (delta $P_{min}$), and the comparison signal is input in a control unit (21) to influence the reference value signals (S1, S2, S3) by which the individual valves (6'; 6''; 6''') are controlled.

32 Claims, 3 Drawing Sheets a1
b1
a2
b2
a3
b3
5'
5''
5'''
6'
6''
6'''
7'
7''
7'''
1
2
3
4
8
9
10
11
12
13
14'
14''
14'''
15'
15''
15'''
16'
16''
16'''
17
18
20
ΔP Max

21
TO PRESSURE DIFFERENCE ADJUSTMENT
33
MULTIPLICATION
38'
MULTIPLICATION
38''
MULTIPLICATION
38'''
MULTIPLICATION
MULTIPLICATION
MULTIPLICATION
35
Σ
36
e2
e1
WHEN e1-e2≥0
a=1
WHEN e1-e2≤0
a = e1/e2
A
37
LIMIT VALUE OF PUMP
LIMIT VALUE 1
LIMIT VALUE 2
LIMIT VALUE 3
RAMP
34'
RAMP
34''
RAMP
34'''
S1
S2
S3
REFERENCE VALUE
REFERENCE VALUE
REFERENCE VALUE

HYDRAULIC SYSTEM

BACKGROUND OF THE INVENTION

The present invention relates to a hydraulic system which is substantially free of instabilities in fluid flow arising from the load demand outstripping the capacity of the feed pump.

German Patent Publication DE 26 51 325 and corresponding U.S. Pat. No. 3,987,622 disclose a hydraulic system wherein the pressure extant at the pump as well as the highest load pressure are applied to a control valve. When the pump cannot furnish the volume flow required by the control valves and their associated consumers, the pressure difference between the pressure of the pump and the highest load pressure is reduced. As a result, the control valve reduces its supply to control pressure transducers by means of which the valves associated with the consumers are actuated. As a result, the flow through the valves is restricted. This restriction, however, becomes effective only when an excess demand already exists. When this restriction becomes effective, the consumers can no longer be controlled by means of their control valves.

In the system disclosed in German Patent Publication DE 35 46 336 and corresponding U.S. Pat. No. 4,759,183, the electrical control signals of the actuated multipleway valves are added. The volume flow which corresponds to the sum of the control signals is compared with the highest possible pump flow. When the sum of the control signals exceeds the possible pump flow, the control signals are reduced. In this system, it is necessary to evaluate all the control signals. Furthermore, it is necessary by means of a computer to take into consideration the dependence of the valve flows on the control signals.

It is the object of the invention to configure the hydraulic systems so that it is not subject to fluctuations, and that, moreover, it becomes possible to effect a desired weighting or apportioning and adjustment of the individual consumer flows relative to the operating parameters of the pump.

SUMMARY OF THE INVENTION

The above and other objects and advantages of the present invention are achieved in the embodiments illustrated herein by the provision of a hydraulic system for feeding hydraulic fluid to a plurality of loads (or consumers) from a common controllable pump which comprises individual control valves associated with each of the loads and responsive to respective external control signals, means for measuring the feed pressure of the pump and the load pressure of each of the plurality of loads, and means for determining the difference between the feed pressure and the highest one of the load pressures and for deriving a difference signal representative of the difference. Means are also provided for adjusting the feed pressure of the pump in response to the difference signal, and means are provided for comparing the difference signal with a predetermined minimum pressure difference signal and for generating a first signal when the pressure difference signal is at least equal to the predetermined minimum difference signal and generating a second signal when the pressure difference signal is less than the predetermined minimum different signal. Further, the hydraulic system also comprises means for adjusting the external control signals in response to the first and second signals.

The invention as defined above has the advantage that the response range of the means for adjusting the external control signals is not exceeded, and as a result, the individual consumers remain controllable even at a high consumption, whereas in the known system, the speed of the individual consumers is no longer controllable when the maximum possible input pump flow is exceeded. A further advantage resides in the fact that not only the pressure difference, but preferably also the change in pressure difference and the direction of change of the pressure difference can be detected. As a result, reduced consumption may commence as soon as a deficiency (i.e. the sum of the said consumer flows exceeds the highest possible input pump flow (maximum pump flow)) is evident as a result of the amount and the direction of the rate of change in the pressure difference.

When total consumer flow determined by the setting of the valves associated with the consumers exceeds the maximum pump flow the actuating signals of the control valves are reduced. The reduction in the consumer flows may be proportionately. However, a reduction based on priorities is also possible, for example, when an individual consumer must maintain its speed relative to other consumers.

This requires an adjustment by the control circuit in accordance with the invention in exceptional cases only, i.e. when the possible pump flow is insufficient to satisfy the consumer flows set by the corresponding valves, the total consumer flow corresponding to the actual feed volume. In such an event, the actual feed volume is reduced by reducing the consumer flows.

The adjustment of the consumer flows relative to the maximum possible pump flow is accomplished by adjusting the valves associated with the consumers. In principle, it may be assumed that these valves are adjusted externally, as by hand or electromagnetically or hydraulically by extrinsic input parameters. In accordance with this invention, an adjustment signal is superimposed on the desired input signals by multiplication, so as to reduce the displacement of the valve piston, when it is found by measuring the pressure difference in the hydraulic system that the deliverable pump flow has been exceeded.

The maximum pump flow does not necessarily correspond to the highest flow deliverable by the pump. Rather, a lower limit value is set, for example, 80% of the highest deliverable pump flow. In this fashion it is possible to prevent operation of the hydraulic system outside its control range in case of an absolute overload of the pump. The same applies equally to the preset minimum pressure difference.

When the minimum value of the pressure difference is exceeded, the consumer flows are adapted as a matter of principle to the preset deliverable pump flow by reducing the sum of the consumer flows to the preset limit value. In the simplest case, this may occur in that all consumer flows are reduced by the same percentage. However, it is also possible to weight apportion the control signals, by which the consumer flows of the individual consumers is decreased by different amounts. As a result, it is possible to give priorities to individual consumers over other consumers. For example, it is possible to ensure that consumers which for safety reasons need at all times to receive a certain consumer flow, for example, hydraulic brakes, have a priority over other consumers, as will be described in more detail at a later point.

A special advantage of the present invention resides in the fact that by monitoring the minimum pressure difference to be maintained, the adjustment of the consumer flows to a preset limit value (maximum pump flow) becomes operative only when the preset limit value has been reached. Thus, several control circuits are superimposed on each other. An inner control circuit utilizes the pressure difference delta P between the pump pressure and the highest load pressure as the actual value, the preset minimum pressure difference as the desired value, and the normal setting of the regulating pump as the adjustment value.

The superimposed outer control circuit utilizes the actually measured pressure difference minus the minimum pressure difference, to reduce the consumer flows and to raise the pressure difference, whenever there is a deficiency (consumption exceeds the maximum pump flow) and a resultant drop below the limit value of the pressure difference (minimum pressure difference).

In addition, the adjustment of the consumer flows of the individual consumers to the load of the preset, maximum pump flow may also be accomplished by superimposing the measured signal obtained by measuring the actually delivered quantity (displacement=normal position of the regulating pump) on the pump capacity or pump moment (delivery volume×delivery pressure) and/or on the delivery pressure. This has the advantage that a desired apportioning of delivery quantity, delivery moment, and delivery pressure of the regulating pump may be preset by adjusting the valve setting relative to the maximum pump flow. In this manner, the delivery output volume and/or the pump torque calculated by multiplying the instantaneous setting of the pump with the delivery pressure of the pump, is compared with a desired torque, and the output signal obtained from the difference is superimposed according to a selectable function, as, for instance, by changing the setting or the adjustability of the valves associated with the individual consumers, only when a preset starting torque is exceeded, but not at a lower limit value. Likewise, it is possible to influence the setting and adjustability of the valves associated with the individual consumers by superimposing the delivery pressure according to a certain function, when a certain pressure is exceeded, but not below this pressure or only by a certain percentage. As a result, the maximum external load is also considered when the valves associated with the consumers, in particular multipleway valves, are influenced.

The pump flow supplied to individual consumers and to the consumers as a whole, is electrically or hydraulically adjusted in that the desired values of the valves associated with individual consumers are adjusted as a function of the pressure difference between the highest consumer pressure and the pump pressure of the regulating pump.

For special applications of the hydraulic system, it may be useful to process the desired values in a special manner. The desired values are the actuating values manually or automatically set for the valves associated with the consumers. These externally fed desired values may be input into the system by way of dampening members or throttles (ramps). This may yield speed changes with which the consumer flows may change in case of abrupt changes of the input desired values. In this fashion it is possible that the speed with which the pump or the pressure balance is changed is in all cases sufficient in order to truck the change in time of the consumer volumes. In this fashion, even a short-term undersupply of the consumers is prevented. Furthermore, a course adjustment is possible of the consumer flows determined by the set input values relative to the highest deliverable volume of the pump. For this purpose, the externally set desired values are made to depend on the sum of the set values and, additionally, on the preset deliverable pump flow and/or the minimum pressure difference. This, on the one hand, yields an apportioning of the individual consumers and assures that there is always an adequate oil flow to the most important consumers, for instance for reasons of safety. On the other hand, a reduction of the desired values takes place in advance, when on the basis of input desired value signals it may be expected that the preset deliverable pump flow will be exceeded.

In the following, embodiments of the invention will be illustrated with reference to the circuit diagrams described below.

DETAILED DESCRIPTION OF THE PREFERRED EMBODIMENTS

Figure 1:
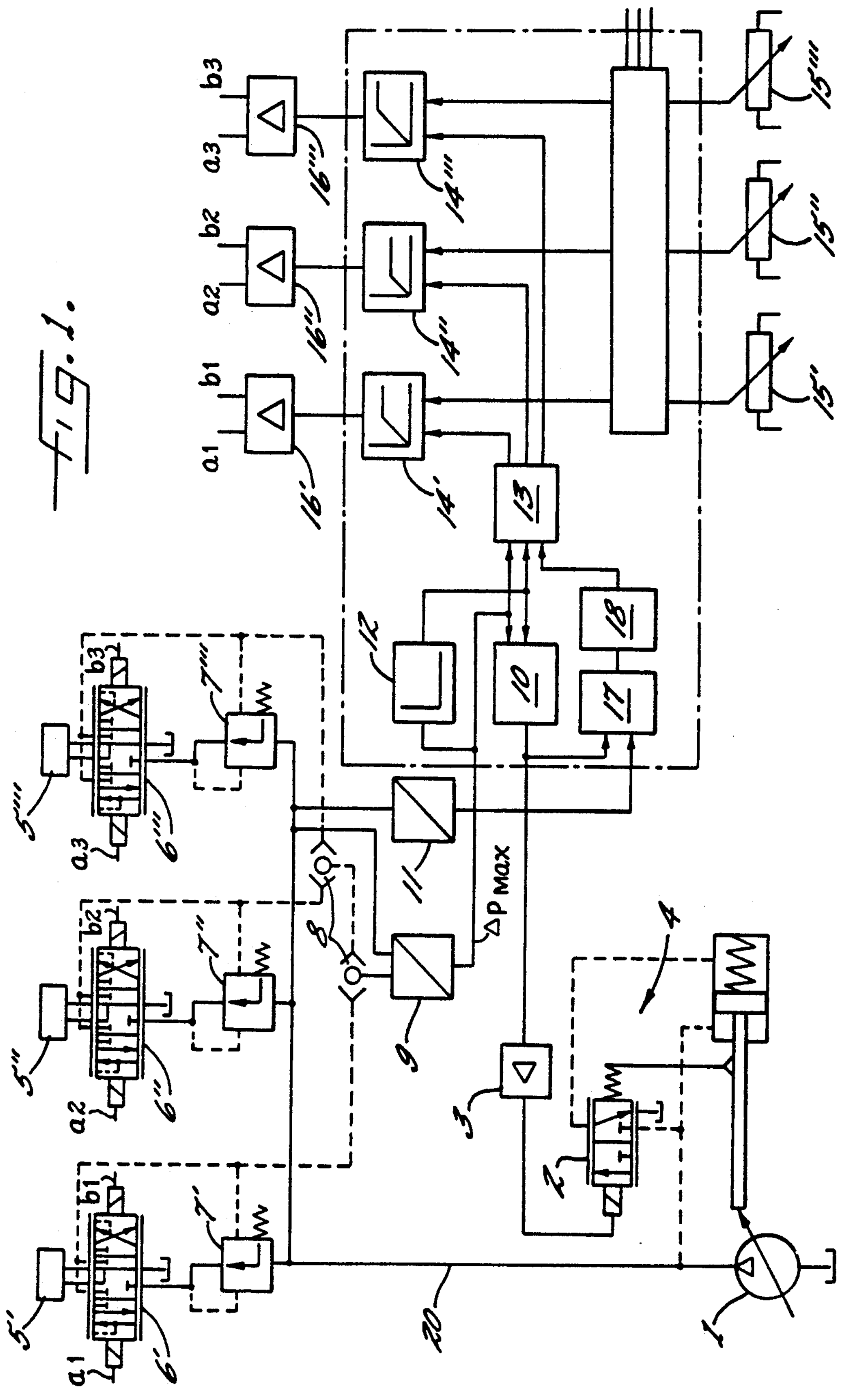
FIG. 1 is a circuit diagram for a hydraulic system with a regulating pump.

Referring more particularly to the drawings, FIG. 1 illustrates several consumers or loads 5′, 5″, 5‴ which are controlled by multiway valves 6′, 6″, 6‴ which are actuated by electromagnets a1–a3, b1–b3. Each multiway valve 6′, 6″, 6‴ is preceded by a pressure regulating valve 7′, 7″, 7‴. Each of the pressure regulating valves 7′, 7″, 7‴ is biased on the one hand by the pressure before the multiway valve 6′, 6″, 6‴, and on the other hand by the consumer pressure behind the multiway valve 6′, 6″, 6‴1 As a result, the volume flow supplied to consumers 5′, 5″, 5‴ is load-independent. The pump pressure respectively forming before the respective pressure regulating valves 7′, 7″, 7‴, and the highest consumer pressure which is determined via a chain of changeover valves 8 are jointly supplied to a subtractor 9, whose output signal represents the pressure drop delta P between pump 1 and the highest consumer pressure. This pressure difference is jointly supplied with its differentiation (differentiation element 12) to a delta-P-regulator 10 which controls regulating valve 2 via an amplifier 3. On the other hand, the two signals are supplied via a weighting element 13 to comparison components 14′, 14″, 14‴ which are each associated to individual correcting elements 16′, 16″, 16‴ of multiway valves 6′, 6″, 6‴. The comparison components 14′, 14″, 14‴ have a second input which may each receive a desired reference value from a reference input element 15′, 15″, 15‴. The comparison components 14′, 14″, 14‴ permit to influence the correcting elements 16′, 16″, 16‴ in the form that the adjustment of valves 6′, 6″, 6‴ is adapted and reduced such that the maximum delivery flow of pump 1 cannot be exceeded.

At the same time, a superposition of moments can occur likewise, in that on the one hand the pump pressure and on the other hand the aforesaid pressure drop are picked up in a multiplication component 17, and that the output signal of this multiplication component 17 is supplied via a comparator 18 to a weighting component 13.

Figure 2:
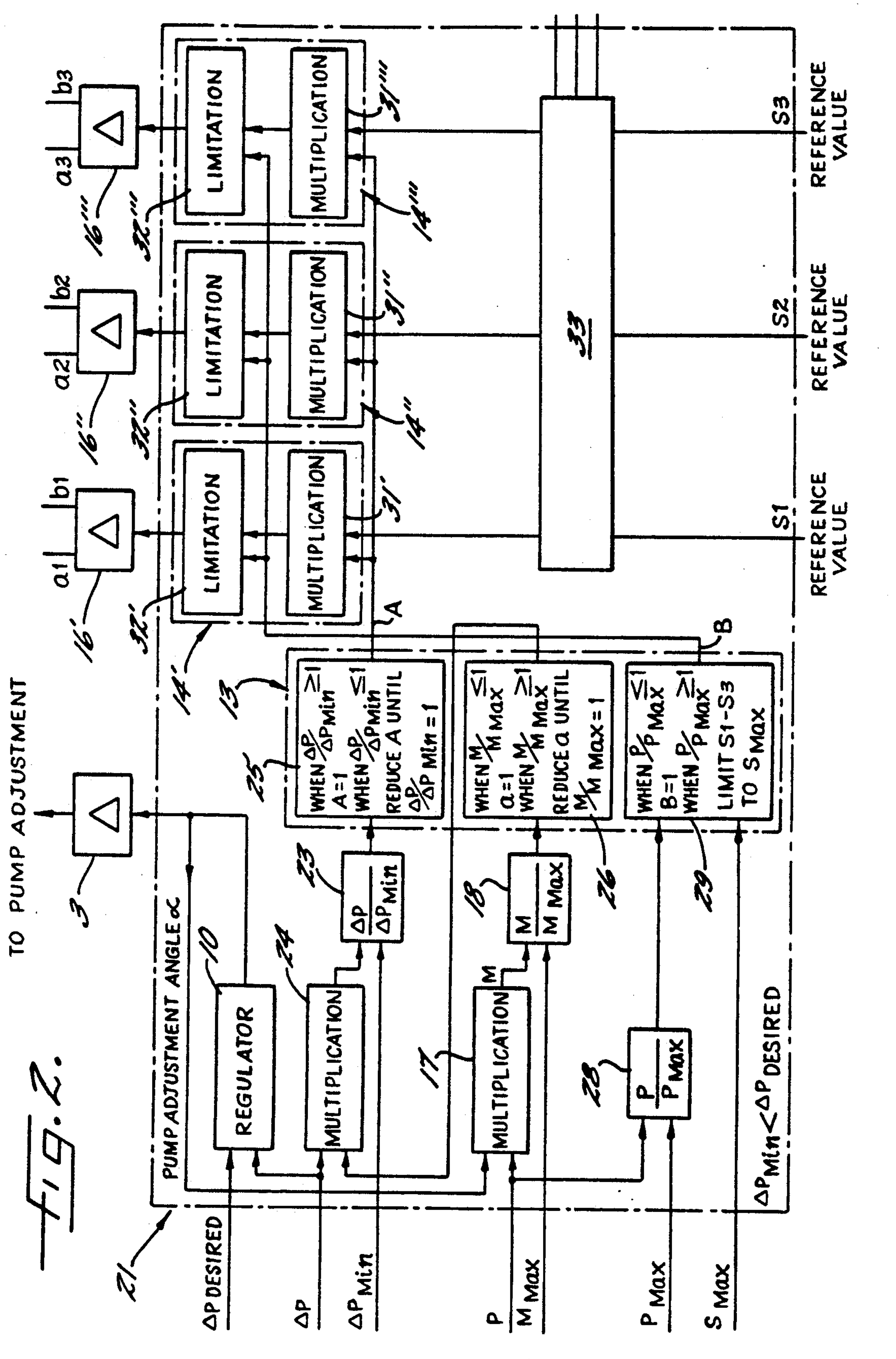
FIG. 2 is circuit diagram with details in accordance with FIG. 1.

FIG. 2 is a functional diagram which illustrates a control unit 21 with functional components contained therein.

Referring to FIG. 2 and with reference to FIG. 1, the following will describe the processing of the reference values which are input in control unit 21, to correcting variables for the multiway valves 6

In control unit 21, the pressure difference delta P is input in a component 23. Simultaneously, a limit value Delta $P_{min}$ is preset in component 23. This limit value may be input constant, when only the input of the pressure difference is connected to control unit 21. When the pump pressure P is also connected, a further processing of the value delta P will occur beforehand, which will be described in more detail further below.

In component 23, the measured or further processed pressure difference and the limit value delta $P_{min}$ are weighted. The output signal of component 23 is supplied to weighting component 13. The latter contains a functional component 25 which results in the positive, constant output signal A equal to 1, as long as the limit value of the pressure difference delta $P_{min}$ is smaller than the measured or respectively further processed pressure difference delta P. When the pressure difference delta P falls below the limit value, the output signal A of functional component 25 becomes smaller than 1. Starting from 1, it reduces in accordance with a time-dependent function, until an equilibrium sets in as a result of an increase of the measured or respectively further processed pressure difference, as will be explained further below.

The pressure difference signal delta P is further supplied to the delta-P-regulator 10. The latter is further supplied with the desired value of the pressure difference, labeled delta P desired in FIG. 2. The output signal of delta-P-regulator 10 is carried via amplifier 3 to the regulating valve 2 which regulates the normal position of pump 1. To this end, the magnet of regulating valve 2 is biased by the output current of amplifier 3. The regulating valve 2 is thereby adjusted in the meaning that the two sides of the adjustment piston are equally biased by pressure, and that the regulating pump 1 is adjusted in the meaning of reducing the delivery quantity (pump flow, pump delivery flow) (the displacement piston moves to the left). As a result, the spring operative on the other side of the valve is biased by return device 4, and the piston of regulating valve 2 is displaced in the meaning that the pressure on the spring side of the displacement piston is released. The regulating pump 1 is thereby adjusted in the meaning of increasing the delivery flow. A reverse effect results when the output signal of amplifier 3 is reduced. In any event, an equilibrium sets in, so that the output signal of the delta-P-regulator forms the adjusted reference value for the normal position of regulating pump 1, and therefore is, at a given speed, also a measure for the actually delivered quantity of pump 1.

The output signal of delta-P-regulator 10 is supplied to multiplication component 17 simultaneously with the pump pressure P which is picked up via pressure converter 11. The output signal of the multiplication component 17 represents the actual torque M of pump 1, since the input signal to amplifier 3 represents the quantity actually delivered by pump 1. This output signal is related in component 18 (comparator) to a maximally possible limit value of the torque. The output signal of comparator 18 is supplied to weighting component 13. In weighting component 13 the output signal from comparison component (comparator) 18 is now processed in a functional component 26 such that it emits a balancing signal = 1, when the actual torque M is smaller than the limit value of the torque, and that it emits a decreasing output signal, as long as the actually determined torque M is greater than the preset constant limit value $M_{max}$. In the latter case, the output signal is reduced, proceeding from 1, in accordance with a time-dependent steady function until, as a result of feeding back the reference values (this will be explained later), the torque M of pump 1 is decreased so much that an equilibrium sets in.

To this end, the output signal of functional component 26 is supplied to a multiplication component 24, together with the pressure difference delta P. In multiplication component 24, the pressure difference and the output signal which has been obtained from the comparison of the torques, are multiplied. The output signal of this multiplication component 24 represents the measured, but further processed pressure difference and is supplied to the previously mentioned and described weighting component 23. The output signal of functional component 26 is thus used to reprocess the pressure difference in multiplication component 24, as has already been indicated before. Thus, in the event of an overload, a constantly reduced delta P signal is supplied to weighting component 23. As a result, also the output signal of weighting component 23 will continuously decrease and lead in functional component 25, as overload delta P/delta $P_{min}$ continues, to a reduction of output signal A.

To also consider the pump pressure P, an input limit value of the pump pressure $P_{max}$ which is input fixed, is related in a further comparator 28 (comparison component) to the actually measured pump pressure P.

The component 13 also contains a functional component 29 which is controlled by the output signal of comparator 28 and additionally by a limit value which represents the maximum reference value $S_{max}$. These input variables are processed in functional component 29 such that the functional component 29 emits an output signal B which is equal to one, as long as the measured pump pressure P is smaller than the limit value $P_{max}$ of the pressure, and which is equal to the limit value $S_{max}$ of the reference values, when the measured pump pressure exceeds the limit value $P_{max}$ of the pump pressure.

The weighting component 13 with its two output signals A of functional component 25 and B of functional component 29 controls then comparison elements 14', 14'', 14''' which are associated each to one of valves 6', 6'', 6''', for the individual consumers 5', 5'', 5'''. Each of these comparison elements 14 receives a different reference value S1, S2, S3 via reference input elements 15', 15'', 15'''. In the comparison elements, the input reference values are superposed with these output signals A and B. The outputs then lead via correcting elements 16', 16'', 16''' to the respective magnets a1, b1; a2, b2; a3, b3 of the respective valves 6', 6'', 6'''. It is thus possible to reduce according to a preadjusted function and a preadjusted reference value S1, S2, S3, the volume flow supplied to the individual consumers 5', 5'', 5''' to such an extent that the total quantity which pump 1 can deliver, is not exceeded. The simultaneous pickup and direct input of the adjustment angle of or the angle of traverse of regulating pump 1 permit to simultaneously ensure in weighting component 13 that an adaptation to the actual torque M of pump 1 proceeds simultaneously with the adaptation of the measured highest pressure difference delta $P_{max}$ to the minimum pressure difference delta $P_{min}$. Likewise, it is possible to include in the weighting the actual pump pressure P or other operating parameters of the hydraulic system.

For this purpose and as shown in FIG. 2, the comparison elements 14 are divided into a multiplication component 31', 31'', 31''' as well as into a limitation component 32', 32'', 32'''. Both the output signal A of functional component 25 and the adjusted reference value S1, S2, S3 are input respectively in the multiplication component. As a result, the adjusted reference value S is related to the actually measured, highest pressure difference delta $P_{max}$, when the sum of the consumer flows exceeds the limit value of the pump flow $P_{max}$. The reference values S1, S2, S3 are correspondingly reduced. The output signal of multiplication component 31 is supplied to limitation component 32, together with the output signal B of functional component 29 which establishes the relation to the measured pump pressure P. When the preset limit value of the pump pressure $P_{max}$ is exceeded, the output signal of limitation component 32 will be limited to the input limit value $S_{max}$ of the reference value. In each of components 32', 32'', 32''', it is possible to further weight the supplied limit value $S_{max}$ in the meaning that either no limitation occurs at all, or that the limit value $S_{max}$ is decreased or increased. This allows to give priorities to the individual consumers 5', 5'', 5'''. Other consumers may be shut down or be treated with a lower priority, when the adjusted reference value inputs S1, S2, S3 would lead to an exceeding of the limit value of the pump flow.

Figure 3:
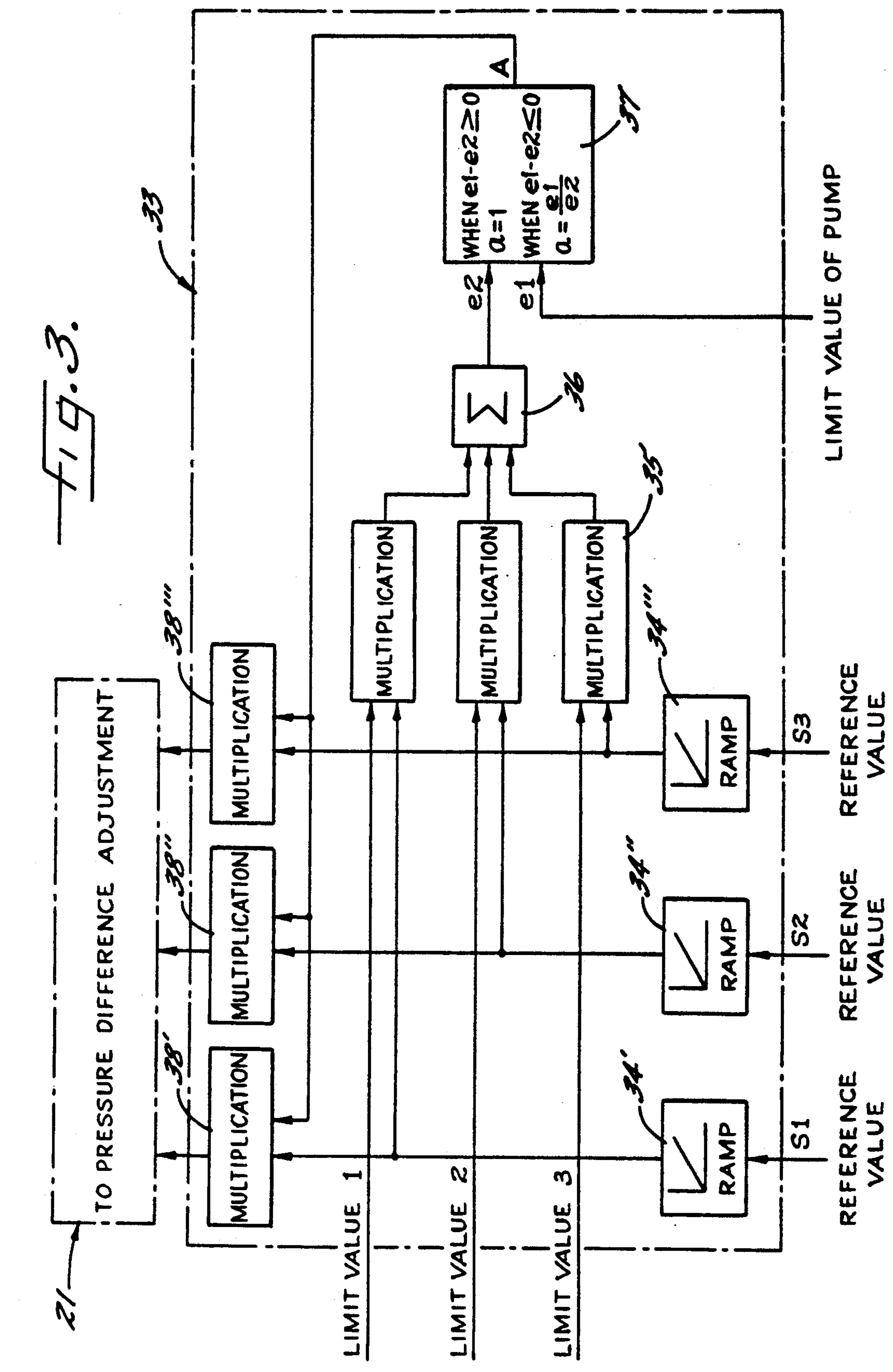
FIG. 3 is a circuit diagram for the reference value preparation.

Shown in FIG. 3 is in addition a reference value preparation which may be used selectively. To this end, the control unit 21 may be preceded by a reference input element 33. The reference input element 33 comprises a first component 34 for each input reference value S1, S2, S3, which is hereafter named ramp 34. This ramp effects that a suddenly input reference value changes only as a function of time. It is thereby effected that also at a sudden reference value input, the signal processing and adaptation of the hydraulic system can follow in time, and that the consumers 5', 5'', 5''' are not temporarily undersupplied. The output signals of the ramps 34 are then multiplied in multiplication components 35 with input limit values G1 to G3. These limit values represent a certain percentage of the limit value of the pump delivery flow. As a result, the input reference values S1, S2, S3 are weighted in multiplication components 35. The output signals of the multiplication components 35 are supplied to a summation element 36 with an output signal e2, which represents the sum of the output signals from the multiplication components.

The signal e2 is supplied to a functional component 37 together with a signal e1. The signal e1 represents the maximally preset delivery flow of the pump in the form which is comparable with the signal e2. In functional component 37, the two input signals e1 and e2 are correlated. The output signal A equals 1, as long as the preset limit value of the pump delivery flow e1 is greater than the adjusted and weighted sum e2 of the reference values S1, S2, S3. The output signal A is equal to the quotient of limit value e1 and weighted sum e2, when the weighted sum e2 is greater than the limit value e1.

The output signal A of functional component 37 is now supplied to multiplication components 38', 38'', 38'''. In each of the multiplication components 38, the respective reference value S1, S2, S3 is multiplied, after having preferably been first conducted over ramps 34', 34'', 34'''. The output signal of the multiplication components 38 represents the respective reference value which is input in comparison component 14. This reference value preparation permits to make provisions already at the input of reference values that the adjusted reference values S1, S2, S3 do not lead to a consumption which exceeds by far the preset limit value of the pump delivery flow e1. However, this is only a rough precaution. In accordance with the invention, the superposition of the adaptation of consumer flows to the measured pump delivery flow ensures that each consumer 5', 5'', 5''', remains operable within its assigned scope.

The special importance of the invention consists in that while the pump torque M is regulated on the one hand, it is possible to superpose this torque regulation with an adjustment of the output, in that simultaneously also the speed of pump 1 or its delivered quantity is determined.

We claim:

1. A hydraulic system for feeding hydraulic fluid to a plurality of loads (5) from a common controllable pump (1) at a rate not exceeding a predetermined capacity of said pump, comprising:

individual control valve means (6) associated with each of said plurality of loads and responsive to respective external control signals ($a^1$, $b^1$);

means for measuring the feed pressure (P) of said pump (1) and the load pressure of each of said plurality of loads;

means (8, 9) for determining the different between said feed pressure (P) and the highest one of said load pressures and for deriving a difference signal ($\Delta P$) representative of said difference;

means (2, 3, 4, 10) for adjusting said feed pressure of said pump in response to said difference signal;

means (23, 25) for comparing the difference signal ($\Delta P$) with a predetermined minimum pressure difference signal ($\Delta P_{min}$) and for generating a first signal when the pressure difference signal ($\Delta P$) is at least equal to said predetermined minimum difference signal ($\Delta P_{min}$) and a second signal when said pressure difference signal ($\Delta P$) is less than said predetermined minimum difference signal ($\Delta P_{min}$); and means (14) for adjusting said external control signals in response to said first and second signals.

2. The hydraulic system defined in claim 1, wherein said first signal equals one, and said second signal is less than one.

3. The hydraulic system defined in claim 2, wherein said second signal is gradually reduced to equilibrium ($\Delta P = \Delta P_{min}$) in accordance with a predetermined function of time.

4. The hydraulic system defined in claim 1, wherein said means for adjusting said feed pressure (P) of said pump (1) comprises amplifier means (3).

5. The hydraulic system defined in claim 4, wherein said means for adjusting said feed pressure (P) of said pump (1) further comprises regulator means (10) responsive to said difference signal ($\Delta P$) and to a desired value ($\Delta P_{desired}$) of said pressure difference.

6. The hydraulic system defined in claim 5, further comprising means for multiplying the output of said regulator means (10) with said feed pressure (P) of said pump (1) to derive the torque (M) of said pump (1).

7. The hydraulic system defined in claim 6, further comprising comparator means (18) for comparing said torque (M) with a predetermined maximum torque ($M_{max}$) and weighting means (26) connected to the output of said comparator means (18) for generating a first output signal when said torque (M) is less than said maximum torque ($M_{max}$) and a second output signal when said torque (M) exceeds said maximum torque ($M_{max}$).

8. The hydraulic system defined in claim 7, wherein said first output signal equals 1 and said second output signal is a value gradually reducing from 1 to equilibrium ($M=M_{max}$) in accordance with a predetermined function of time.

9. The hydraulic system defined in claim 8, further comprising multiplication means for multiplying one of said first and second output signals with said pressure difference signal ($\Delta P$) to derive a processed pressure difference signal.

10. The hydraulic system defined in claim 9, further comprising means (25) for comparing said processed pressure difference signal with a predetermined minimum pressure difference signal ($\Delta P_{min}$) to derive said first and second signals.

11. The hydraulic system defined in claim 9, further comprising means (28) for comparing said feed pressure (P) of said pump (1) with a predetermined maximum pump pressure ($P_{max}$) for deriving a first difference value if said feed pressure (P) of said pump (1) is less than said predetermined maximum pump pressure ($P_{max}$) and a second difference value if said feed pressure (P) exceeds said predetermined maximum pressure ($P_{max}$).

12. The hydraulic system defined in claim 11, further comprising means (29) for comparing said first and second difference values with a maximum external value ($S_{max}$) and for generating a first compared signal in response to said first difference value and a second compared signal in response to said second difference value.

13. The hydraulic system defined in claim 12, wherein said first compared signal equals 1 and said second compared signal equals $S_{max}$.

14. The hydraulic system defined in claim 13, wherein said means (14) for adjusting said external control signals is further adjusted in response to said first and second compared signal.

15. The hydraulic system defined in claim 14, wherein said means (14) for adjusting said external control signals of said control valve means (6) further comprises limiting means (32) and multiplication means (31) and manual input means (15) connected thereto.

16. The hydraulic system defined in claim 15, wherein the output of said first and second signal deriving means (25) is connected to said multiplication means (31) and wherein the output of said first and second difference value comparing means (29) is connected to said limiting means (32).

17. The hydraulic system defined in claim 16, wherein said manual input means (15) comprises ramp means (34) for gradually adjusting abrupt changes in manually input signals.

18. The hydraulic system defined in claim 17, further comprising multiplication means (35) for multiplying the output of said ramp means (34) with threshold values representative of predetermined percentages of pump feed capacity.

19. The hydraulic system defined in claim 18, further comprising means (36) for summing the output of said multiplication means (35).

20. The hydraulic system defined in claim 19, further comprising means (37) for deriving first and second output values from the output ($e_2$) of said summing means (36) and a value ($e_1$) representative of maximum pump capacity, the first output valve being equal to 1 if $e_1$ exceeds $e_2$ and the second output valve being the quotient $e_1/e_2$ if $e_1$ is less than $e_2$.

21. The hydraulic system defined in claim 20, further comprising means for multiplying the output of said ramp means (34) and one of said first and second output values.

22. The hydraulic system of claim 1, further comprising means (28) for comparing said feed pressure (P) of said pump (1) with a predetermined maximum pump pressure ($P_{max}$) for deriving a first difference value if said feed pressure (P) of said pump (1) is less than said difference maximum pump pressure ($P_{max}$) and a second difference value if said feed pressure (P) exceeds said difference maximum pressure ($P_{max}$).

23. The hydraulic system defined in claim 22, further comprising means (29) for comparing said first and second difference values with a maximum external value ($S_{max}$) and for generating a first compared signal in response to said first difference value and a second compared signal in response to said second difference value.

24. The hydraulic system defined in claim 23, wherein said first compared signal equals 1 and said second compared signal equals $S_{max}$.

25. The hydraulic system defined in claim 24, wherein said means (14) for adjusting said external control signals is further adjusted in response to said first and second compared signals.

26. The hydraulic system defined in claim 25, wherein said means (14) for adjusting said external control signals of said control valve means (6) further comprises limiting means (32) and multiplication means (31) and manual input means (15) connected thereto.

27. The hydraulic system defined in claim 26, wherein the output of said first and second signal deriving means (25) is connected to said multiplication means (31) and wherein the output of said first and second difference value comparing means (29) is connected to said limiting means (32).

28. The hydraulic system defined in claim 27, wherein said manual input means 915) comprises ram means (34) for gradually adjusting abrupt changes in manually input signals.

29. The hydraulic system defined in claim 28, further comprising multiplication means (35) for multiplying the output of said ramp means (34) with threshold values representative of predetermined percentages of pump feed capacity.

30. The hydraulic system defined in claim 29, further comprising means (36) for summing the output of said multiplication means (35).

31. The hydraulic system defined in claim 30, further comprising means (37) for deriving first and second output values from the output ($e_2$) of said summing means (36) and a value ($e_1$) representative of maximum pump capacity, the first output value being equal to 1 if $e_1$ exceeds $e_2$ and the second output value being the quotient $e_1/e_2$ if $e_1$ is less than $e_2$.

32. The hydraulic system defined in claim 31, further comprising means for multiplying the output of said ramp means (34) and one of said first and second output values.

* * * * *